United States Patent [19]
Sezai

[11] Patent Number: 5,448,247
[45] Date of Patent: Sep. 5, 1995

[54] BEAM COMPRESSION METHOD FOR RADAR ANTENNA PATTERNS

[75] Inventor: Toshihiro Sezai, Tokyo, Japan

[73] Assignee: National Space Development Agency of Japan, Tokyo, Japan

[21] Appl. No.: 149,117

[22] Filed: Nov. 9, 1993

[30] Foreign Application Priority Data

Dec. 15, 1992 [JP] Japan ................ 4-353727

[51] Int. Cl.⁶ .......................... G01S 3/16; G01S 3/28
[52] U.S. Cl. .................................. 42/382; 42/378
[58] Field of Search ........................... 342/378, 382

[56] References Cited

U.S. PATENT DOCUMENTS

| | | | |
|---|---|---|---|
| 3,750,152 | 7/1973 | Waful | 367/100 |
| 4,416,552 | 11/1983 | Hessener, Jr. et al. | |
| 5,059,966 | 10/1991 | Fujisaka et al. | |
| 5,252,983 | 10/1993 | Sezai | 342/382 |
| 5,296,864 | 3/1994 | Sezai | 342/382 |

FOREIGN PATENT DOCUMENTS 0142293  5/1985  European Pat. Off. .
0358342  3/1990  European Pat. Off. .

OTHER PUBLICATIONS

Patent Abstracts of Japan—vol. 001, No. 098 (E-041) Aug. 31, 1977 & JP-A-52 032 293 (Koden Electronics Co. Ltd.) Mar. 11, 1977.
Patent Abstracts of Japan—Directivity Compression Receiving Equipment—JPA 52032293—Mar. 11, 1977 (Koden Electronics Co. Ltd.).

*Primary Examiner*—Thomas H. Tarcza
*Assistant Examiner*—Dao L. Phan
*Attorney, Agent, or Firm*—Armstrong, Westerman, Hattori, McLeland and Naughton

[57] ABSTRACT

An antenna system is formed by arranging a sub-antenna adjacent to a main antenna along the direction of the beam width to be reduced of the main antenna and in such a way that the beam axis of the sub-antenna is coincident with that of the main antenna. The antenna beam of this antenna system is scanned along the beam width direction and received signals obtained by the main and sub-antennas are set in phase and subjected to multiplication and signal processing by a multiplication circuit and signal processing circuit. When the ratio of the value of the synthetic reception pattern obtained by the multiplication to the maximum set value of the radar display device is not less than a preset value, the received signal of the main antenna corresponding to the range of angle of the beam width of the synthetic reception pattern is output as the final output signal instead of the synthetic reception pattern, and, when the ratio of the value of the synthetic reception pattern to the maximum set value is less than the preset value, the output is cut off.

6 Claims, 6 Drawing Sheets

FIG.1

PRIOR ART

BEAM COMPRESSION METHOD FOR RADAR ANTENNA PATTERNS

BACKGROUND OF THE INVENTION

This invention relates to a beam compression method for radar antenna patterns for removing any distortions in the synthetic reception pattern generated when performing beam compression on an antenna pattern based on the principle of multiplicative array, thereby achieving an improvement in terms of beam compression performance.

Generally, beam width is one of the indexes indicating the quality of the antenna pattern of a receiving antenna, etc. The smaller the beam width, the better the quality of the antenna pattern. However, the beam width and the size (length) of an antenna are inversely proportional to each other. Thus, an attempt to reduce the beam width will result in an increase in the antenna size. On the other hand, reducing the antenna size leads to an increase in the beam width.

For example, in a radar antenna, doubling the power of identification, i.e., the resolution, involves a reduction in the beam width by half, resulting in the antenna size being doubled. Such an increase in antenna size not only results in an increase in the area occupied by the antenna but so leads to various problems, such as an increase in the weight of the antenna and the size of the structure supporting it. On the other hand reducing the antenna size by half results in the beam width being doubled, resulting the identification power being reduced by half.

This reciprocal relationship between beam width and antenna size is well known. In most antennas in use, there is a limit to the area they can occupy, etc. Thus, a compromise has to be made with a certain measure of beam width.

Figure 1:
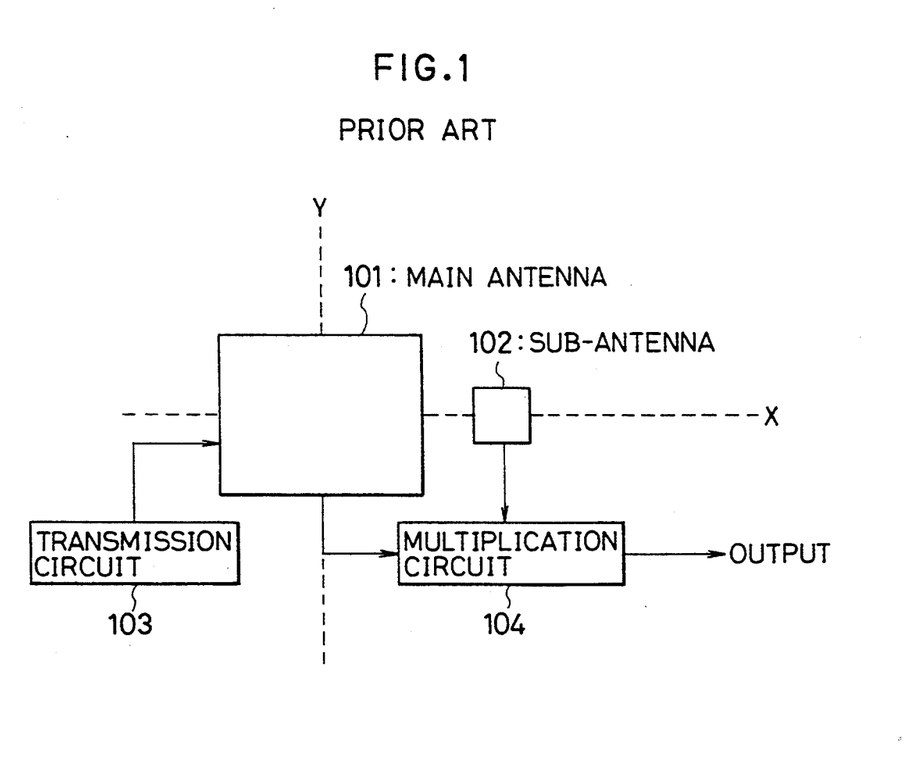
FIG. 1 is a schematic diagram showing the construction of a conventional antenna device which effects beam compression on antenna patterns.

To solve this problem, a beam compression method has been known in which received signals of a plurality of antennas are multiplied in accordance with the principle of multiplication array so as to attain to a reduction in beam width. FIG. 1 shows an antenna device for effecting such a beam compression. In the drawing, numeral 101 indicates a main antenna consisting, for example, of an array antenna which is composed of a plurality of radiation elements linearly arranged at equal intervals; numeral 102 indicates a sub-antenna spaced apart from the main antenna 101 along the X-direction, which is the direction of the beam width to be compressed; numeral 103 indicates a transmission circuit, where transmission power to be supplied to the main antenna 101 is obtained; and numeral 104 indicates a multiplication circuit for multiplying the received signals of the main antenna 101 and the received signals of the sub-antenna 102. In the example shown, the direction of the beam axis is perpendicular to the X-Y plane, that is, the plane of the drawing.

Figure 2A:
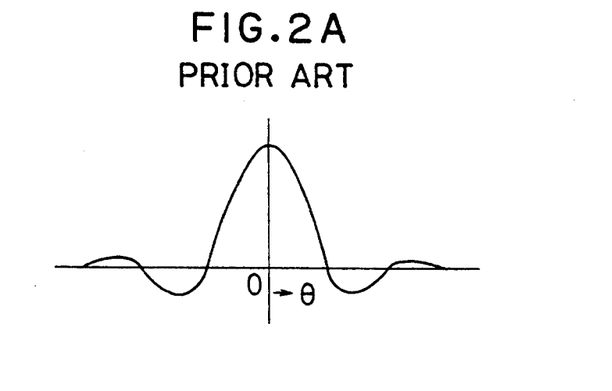
FIGS. 2A, 2B and 2C respectively show the directional characteristic of the main antenna, the directional characteristic of the sub-antenna and the synthetic directional characteristic of the antenna device shown in FIG. 1.
Figure 2B:
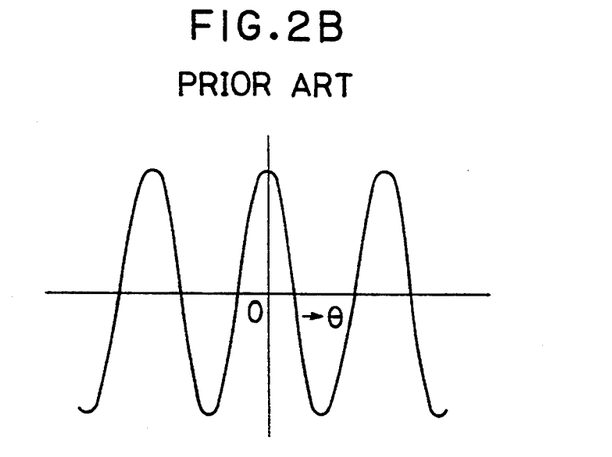
Figure 2C:
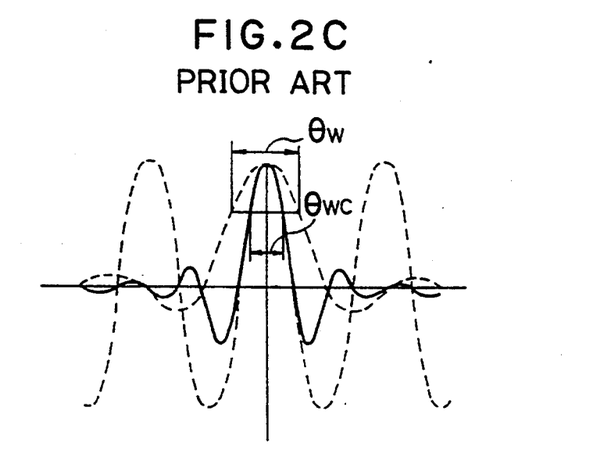

In the above-described antenna device, signals received by the antennas 101 and 102 are supplied in phase to the multiplication circuit 104 to be subjected to multiplication processing, whereby the directional characteristic of the main antenna 101 which is, for example, as shown in FIG. 2A, and the directional characteristic of the sub-antenna 102 as shown in FIG. 2B are multiplied, thereby obtaining a synthetic directional characteristic as indicated by the solid line in FIG. 2C, in which the beam width has been compressed from $\theta w$ to $\theta wc$.

When applied to radar, the above-described conventional beam compression method for antenna patterns provides an effect equivalent to beam compression. However, there is a problem that, due to the grating lobe of the sub-antenna 102, if scattering objects which are of the same magnitude in terms of radio wave exist at different positions, a difference in magnitude occurs in the synthetic reception pattern formed through multiplication, that is, a distortion is generated in the synthetic reception pattern.

SUMMARY OF THE INVENTION

The present invention has been made with a view toward solving the above problem in the prior-art beam compression method for antenna patterns. It is accordingly an object of this invention to provide a beam compression method for radar antenna patterns which is capable of effecting beam compression while preventing generation of distortions in the synthetic reception patterns.

To solve the above problem, there is provided, in accordance with the present invention, a beam compression method comprising the steps of providing an antenna system consisting of a main antenna for transmitting and receiving radio waves and at least one reception-only sub-antenna which is adjacent to the main antenna along the direction of a beam width of the main antenna to be compressed and which is arranged in such a way that its beam axis is coincident with a beam axis of the main antenna; scanning an antenna beam of the antenna system along the direction of the beam width to be compressed and receiving, by the main antenna and the sub-antenna, a radio wave emitted from the main antenna and returning from a scattering object after having been reflected thereby; and settling received signals of the main antenna and the sub-antenna in phase and subjecting them to a multiplication process, the beam compression method further comprising an output signal processing step wherein, when the ratio of the value of a synthetic reception pattern obtained by the multiplication process to a maximum set value of a radar display device is not less than a preset value, a received signal of the main antenna which corresponds to the range of angle of the beam width at which the ratio of value of the synthetic reception pattern to the maximum set value of the radar display device is not less than the preset value, is output as a final antenna pattern output instead of the synthetic reception pattern, and wherein, when the ratio of the value of the synthetic reception pattern to the maximum set value is less than the preset value, there is no antenna pattern output.

Generally, as stated above, when applied to radar, the beam compression method based on multiplication reduces the expansion of the synthetic reception pattern near the position where a scattering object exists, so that an effect equivalent to beam compression cain be obtained. However, if scattering objects of the same magnitude in terms of radio wave exist at different positions, their magnitude as appearing in the synthetic reception pattern may greatly differ from each other. In contrast, in the reception pattern of the main antenna, the expansion near the position where a scattering object exists is large. However, if scattering objects of the same magnitude in terms of radio wave exist, the magnitudes of the reception patterns are substantially the same, little distortion being generated therein. Generally, in display of radar received signals, only those received signals whose values are 0.1 or more relative to the maximum set value of the radar display device are displayed in view of the fact that the dynamic range of a CRT used as the radar display device is only 10 dB and that it is necessary to eliminate the influence of the side lobe. Depending upon the object of observation, only those received signals of not less than a value which is different from 0.1 relative to the above-mentioned maximum set value may be displayed.

In view of this, in the present invention, when the ratio of the value of the synthetic reception pattern, obtained by the multiplication process reducing the expansion of the reception pattern, to the maximum set value of the radar display device is not less than a preset value, the reception pattern of the main antenna which corresponds to the range of angle of the beam width at which the ratio of the value of the synthetic reception pattern to the maximum set value is not less than the preset value, is output as the final output signal instead of the synthetic reception pattern, and, when the ratio of the value of the synthetic reception pattern to the maximum set value is less than the preset value, the antenna pattern output is cut. The range of angle of the beam width at which the ratio of the value of the synthetic reception pattern, obtained by the multiplication process, to the maximum set value of the radar display device is not less the preset value, is reduced as a result of beam compression, so that the received signal of the main antenna corresponding to this reduced range of angle is output as the final output signal. Since the received signal of the main antenna is relatively free from distortion, beam compression is effected, and a reception pattern which is free from distortion can be obtained. The preset value of the ratio of the synthetic reception pattern to the maximum set value of the radar display device is generally 0.1. However, for particular objects of observation as in the case of harbor radar or air control radar, a value of ratio different from 0.1 may provide more satisfactory results. Thus, an optimum value of the above ratio is determined by experiment, etc. in accordance with the object of observation.

DETAILED DESCRIPTION OF THE PREFERRED EMBODIMENT

Figure 3:
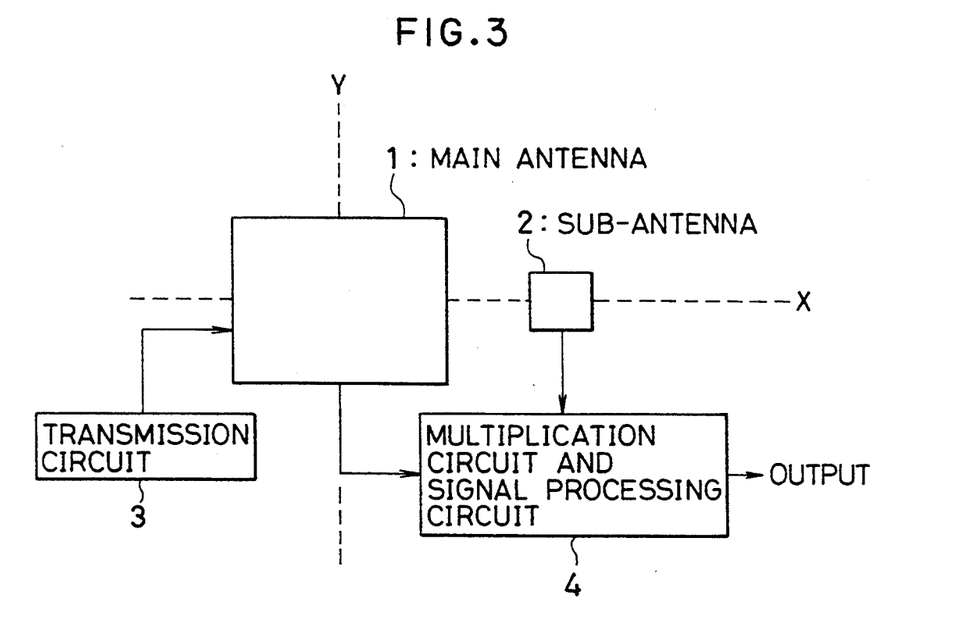
FIG. 3 is a schematic diagram showing the construction of an antenna device for illustrating an antenna pattern beam compression method according to an embodiment of the present invention.

An embodiment of the present invention will now be described. FIG. 3 is a schematic view showing the construction of an antenna device for illustrating an antenna pattern beam compression method according to an embodiment of the present invention. In the drawing, numeral 1 indicates a main antenna for transmitting and receiving radio waves which may comprise a horn antenna, array antenna or the like. Numeral 2 indicates a reception-only sub-antenna which may comprise any type of antenna, such as a dipole antenna, horn antenna, array antenna, etc. The sub-antenna 2 is adjacent to the main antenna 1 along the direction (X-direction) of the beam width to be compressed of the reception pattern of the main antenna 1 and is arranged in such a way that its beam axis is coincident with the beam axis of the main antenna (extending along the direction perpendicular to the X-Y plane). Numeral 3 indicates a transmission circuit which outputs a transmission power to be supplied to the main antenna 1 and transmitted therefrom. Numeral 4 indicates a multiplication circuit and signal-processing circuit for received signals, which perform multiplication on the received signals of the main antenna 1 and the sub-antenna 2 and which, when the value of the synthetic reception pattern obtained through multiplication is not less than 0.1 relative to the maximum set value of the radar display device, causes the received signal of the main antenna 1 corresponding to the range of angle of the beam width of this synthetic reception pattern to me output as the final output signal instead of the synthetic reception pattern, and, when the value of the synthetic reception pattern is less than 0.1 relative to the maximum set value of the radar display device, the final antenna pattern output signal is not output.

In this antenna device, constructed as described above, the antenna beam is scanned while transmitting a radio wave from the main antenna 1, and, when the transmitted radio wave returns after having been reflected by a scattering object, the main antenna 1 and the sub-antenna 2 output received signals corresponding their respective antenna patterns. These reception outputs are set in phase and subjected to multiplication and signal processing by the multiplication circuit and signal processing circuit 4. When the output thereby obtained is the final output, beam compression is effected, and an output which is free from distortion can be obtained.

Figure 4:
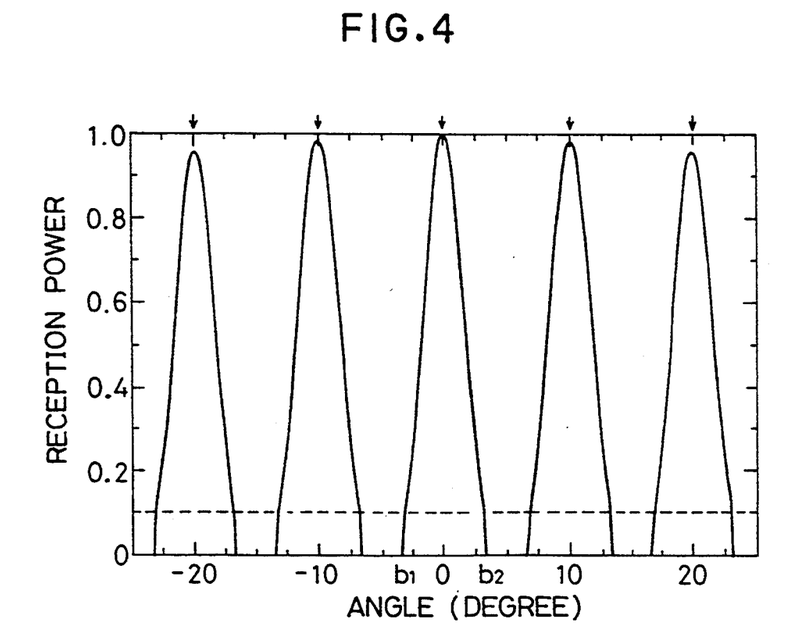
FIG. 4 shows the results of a simulation on a reception power pattern of the main antenna.
Figure 5:
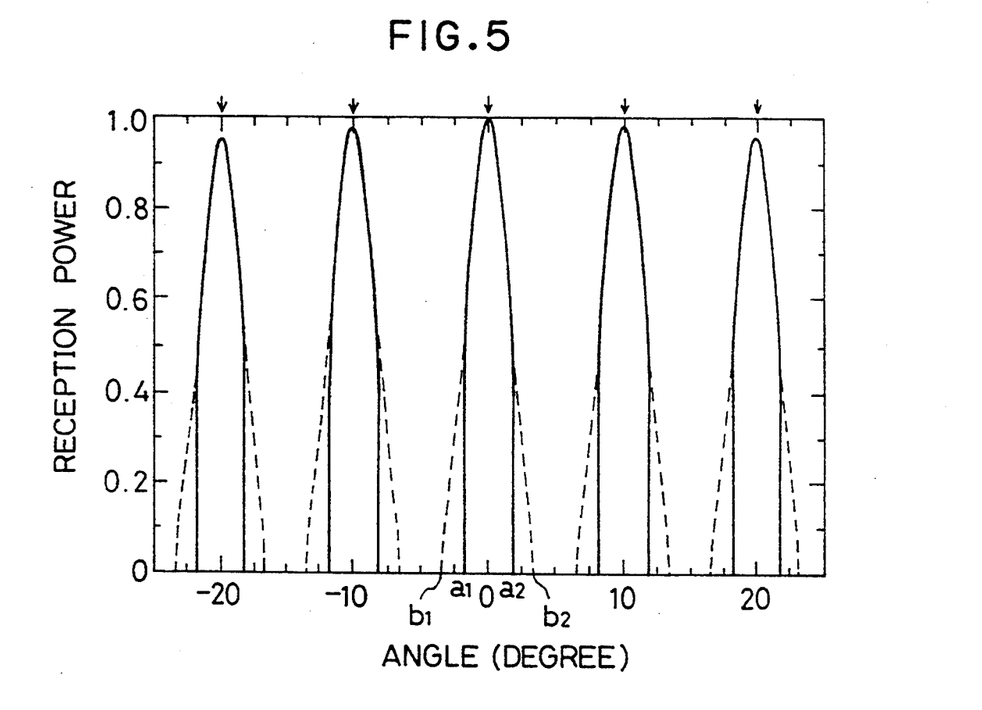
FIG. 5 shows the results of a simulation on a reception power pattern obtained by the beam compression method of the present invention.
Figure 6:
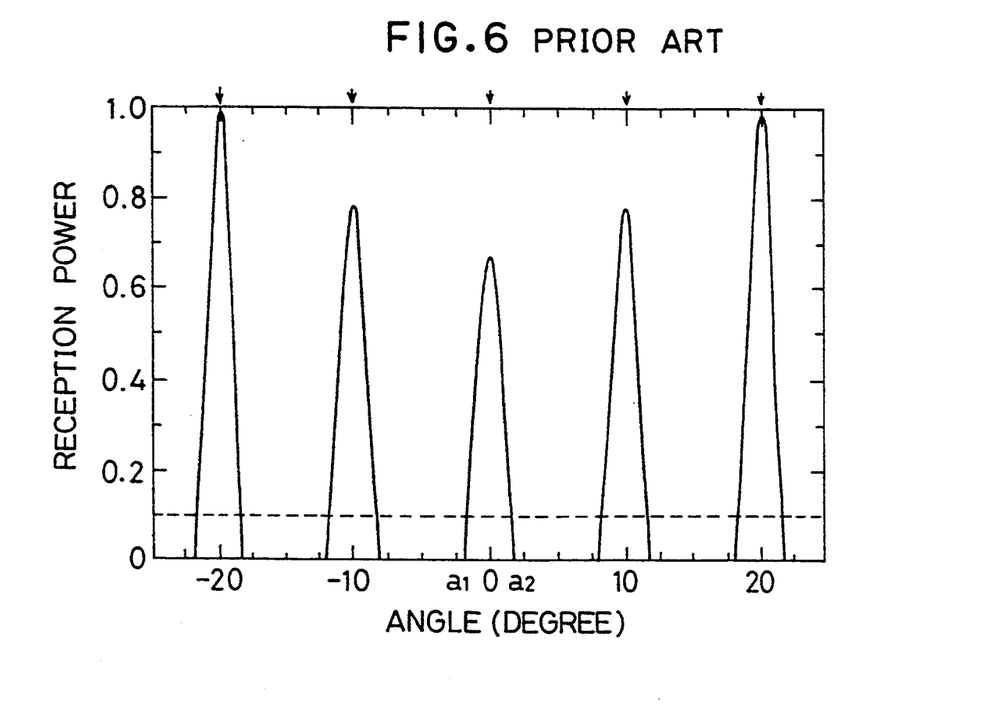
FIG. 6 shows the results of a simulation on a reception power pattern obtained by a conventional beam compression method.

FIGS. 4 through 6 show the results of reception power pattern simulations using an antenna system the main antenna of which consists of a rectangular antenna of a uniform distribution having an antenna length as measured along the scanning direction ten times larger than the reception wavelength, and the sub-antenna of which consists of a rectangular antenna of a uniform distribution having an antenna length as measured along the scanning direction one time larger than the wavelength of the radio wave, with point scattering objects of the same magnitude in terms of radio wave exist at positions at equal distances from the antenna system in the directions of $+20°$, $+10°$, $0°$, $-10°$, and $-20°$ from the antenna rotation axis. FIG. 4 is a diagram showing a reception power pattern of the main antenna; FIG. 5 is a diagram showing a reception power pattern obtained by the beam compression method of the present invention; and FIG. 6 is a diagram showing a synthetic reception power pattern obtained by a conventional beam compression method. These patterns are shown in relation to their respective maximum values. The downwardly directed arrows at the top of these drawings indicate the positions where the point scattering objects exist. In FIGS. 4 and 6, the reception power patterns or the synthetic reception power patterns of the point scattering objects are all not less than 0.1 relative to the maximum set value of the radar display device, and FIG. 5 shows a reception power pattern in the present invention which corresponds to the case where the synthetic reception power pattern of FIG. 6 is 0.1 or more. Further, for comparison, the portions of the reception power pattern of the main antenna where the output is cut are indicated by the dotted lines.

As can be seen from these drawings, in accordance with the beam compression method of the present invention, it is possible to remove the distortion in the pattern involved in the conventional beam compression methods, i.e., the distortion in which, as shown in the simulation of FIG. 6, the nearer to the 0° direction of the antenna rotation axis, the lower the reception power, and, further, a reception power pattern is obtained in which the beam is more compressed than in the antenna pattern of the main antenna. That is, when a reflected radio wave is received by a single antenna without performing compression processing, the range of angle in which a scattering object is judged to exist is, in the case of the portion around 0° of the reception power pattern of the main antenna of FIG. 4, the range of angle of $b_2$ to $b_2$. The range of angle of the scattering object when beam compression is performed through multiplication is reduced, as indicated by the range of $a_1$ to $a_2$ around 0° of FIG. 6. Therefore, in the reception power pattern of the main antenna, only this small range of angle of $a_1$ to $a_2$ is caused to be output, whereby a reception power pattern is obtained in which, as indicated by the solid lines of FIG. 5, the distortion has been removed and beam compression effected.

Figure 7:
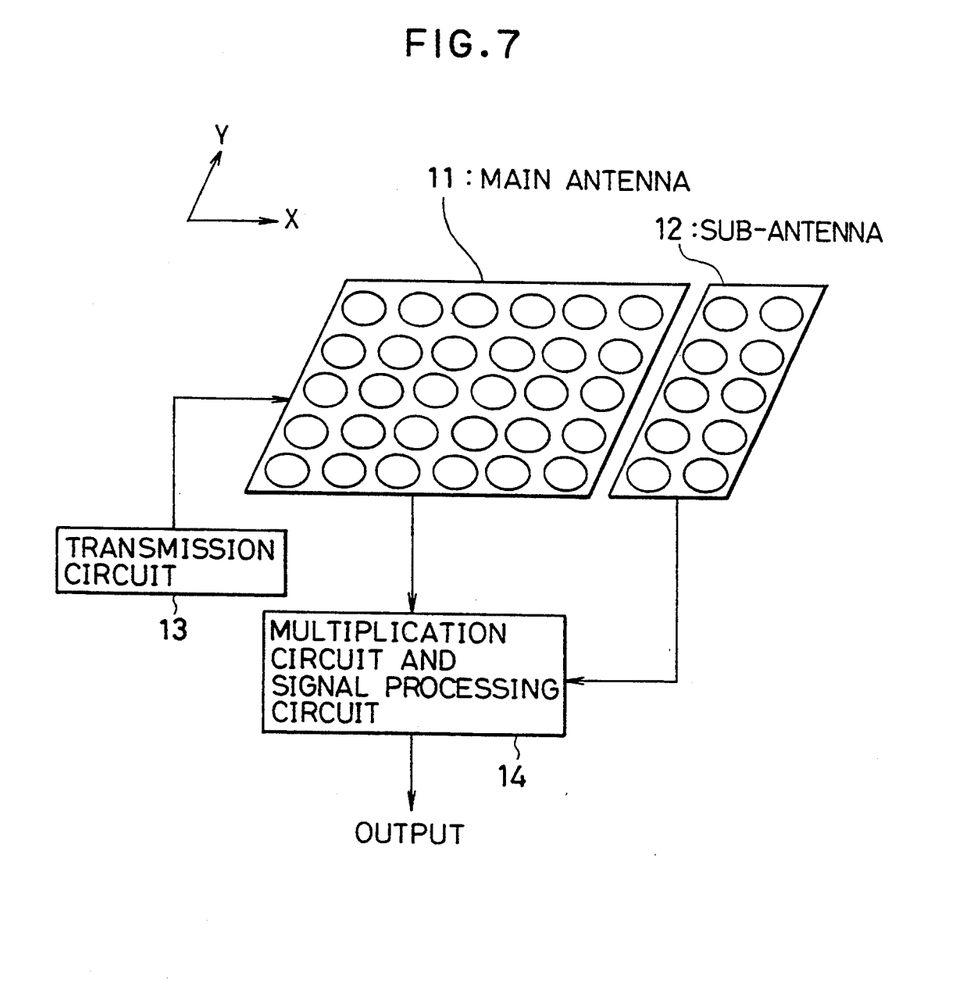
FIG. 7 is a perspective view showing a specific example of the construction of the antenna device shown in FIG. 3.

Next, a specific example of the construction of an antenna device used in executing the antenna pattern compression method of the present invention will be described with reference to FIG. 7. In this example, an antenna system is formed by using circular patch array antennas for both a main antenna 11 and a sub-antenna 12. The sub-antenna 12 is spaced apart from the main antenna 11 along the direction of the beam width to be compressed (the X-direction). Transmission power is supplied from a transmission circuit 13 to the main antenna 11, received signals of the main antenna 11 an the sub-antenna 12 being input to a multiplication circuit and a signal processing circuit 14 to be processed thereby.

Figure 8:
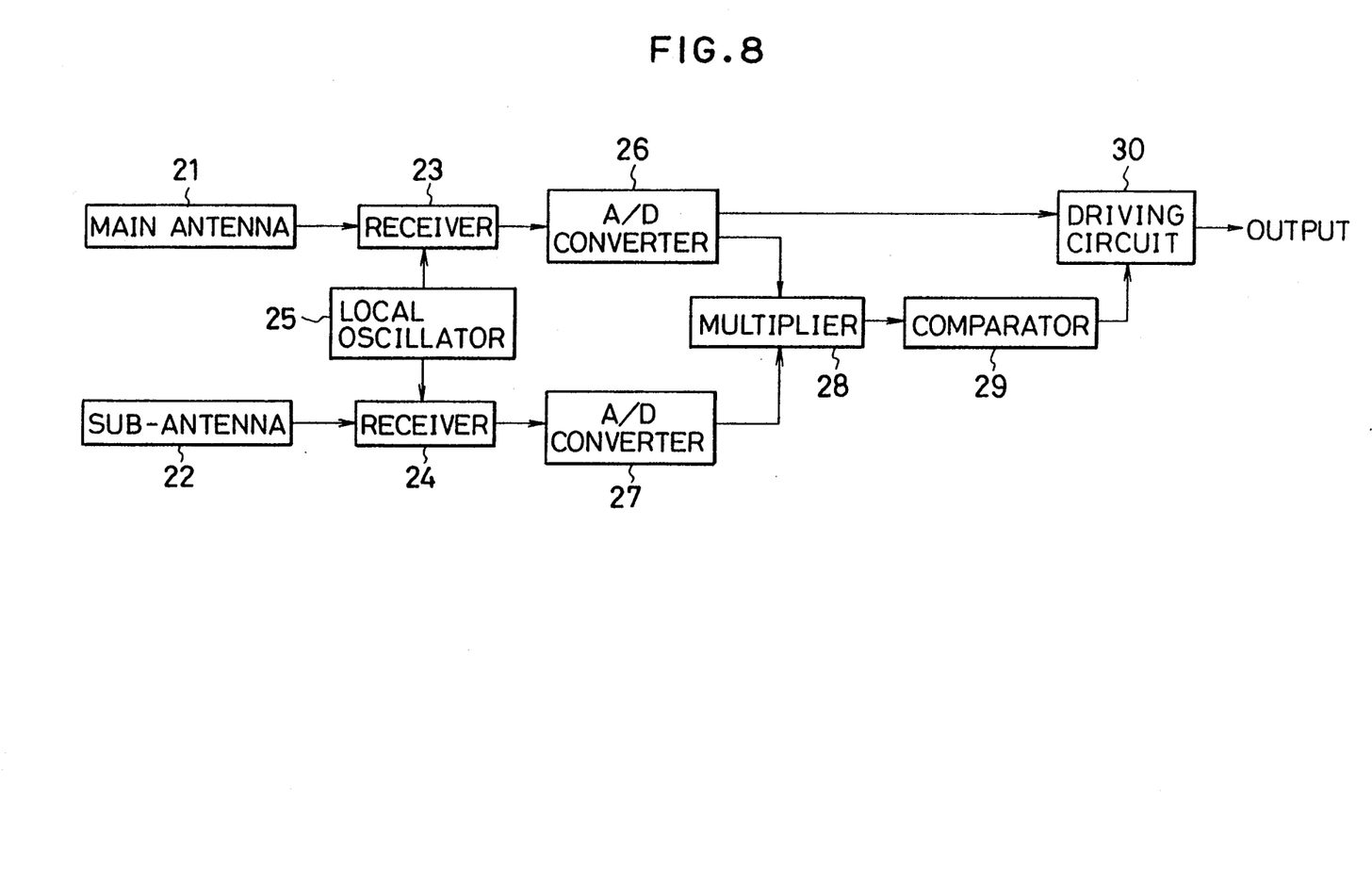
FIG. 8 is a block diagram showing a specific example of the construction of the multiplication circuit and the signal processing circuit shown in FIG. 7.

The transmission circuit 13 nay be of a well-known construction. Regarding the multiplication circuit and signal-processing circuit 14 a variety of techniques are applicable, for example, a means for performing multiplication and signal-value comparison by using a computer after converting received signals into digital ones by an A/D converter. FIG. 8 shows an example of the construction of the multiplication circuit and signal processing circuit 14. Referring to FIG. 8, numeral 21 indicates a main antenna; numeral 22 indicates a sub-antenna; numerals 23 and 24 indicate receivers for receiving radio waves picked up by the antennas 21 and 22; numeral 25 indicates a local oscillator for supplying the receivers 23 and 24 with identical local signals; numerals 26 and 27 indicate A/D converters for converting the outputs of the receivers 23 and 24 to digital signals; numeral 28 indicates a multiplier for multiplying the outputs of the A/D converters 26 and 27; numeral 29 indicates a comparator for comparing the output of the multiplier 28 with a predetermined value which is 0.1 relative to the maximum set value of the radar display device; and numeral 30 indicates a driving circuit for outputting the received signals of the main antenna which have been converted to digital signals by the A/D converter 26.

In the multiplication circuit and signal processing circuit, constructed as described above, received signals of the main antenna 21 and the sub-antenna 22 are input to the receivers 23 and 24, which receive identical local signals from the local oscillator 25 to output the amplitudes and phases of the received signals. The outputs of the receivers 23 and 24 are input to the A/D converters 26 and 27 to be converted to digital values and then subjected to by a multiplication process by the multiplier 28. The output of the multiplier 28 is input to the comparator 29 to be compared with the predetermined value which is 0.1 relative to the maximum set value of the radar display device, the comparison output constituting a control signal for driving the driving circuit 30 to control the output of the received signal of the main antenna.

Although in the above-described example of the antenna device a single antenna is used as the sub-antenna, it is also possible to use a plurality of antennas as the sub-antenna, which may consist of any type of antennas, such as dipole antennas, horn antennas, array antennas, etc. The multiplication processing when a plurality of antennas are used as the sub-antenna can be conducted by one of the following two systems: in a first system, the outputs of the plurality of sub-antennas are added together and then multiplied by the output of the main antenna. In this system, the reception power of the sub-antenna increases, so that the antenna gain and the S/N ratio are more satisfactory than in the case where a single antenna is used as the sub-antenna. In a second system, the output of each of the plurality of antennas constituting the sub-antenna is multiplied by the output of the main antenna. In this system, a reduction in side lobe can be attained as well as beam width compression As described above with reference to a specific embodiment, in accordance with thee present invention, when, in performing multiplication on the received signals of the main and sub-antennas, the ratio of the value of the synthetic reception pattern obtained by the multiplication to the maximum set value of the radar display device is not less than a preset value, the received signal of the main antenna which corresponds to the range of angle of the beam width of the synthetic reception pattern is output as the final output signal instead of the synthetic reception pattern, and, when the ratio of the value of the synthetic reception pattern to the above-mentioned maximum set value is less than the preset value, there is no antenna pattern output, whereby the distortion in the reception pattern involved in the conventional beam compression methods is eliminated and, at the same time, the beam width of the main antenna can be compressed.

What is claimed is:

1. A beam compression method for radar antenna patterns, comprising the steps of:

providing an antenna system including a main antenna for transmitting and receiving radio waves and at least one reception-only sub-antenna which is adjacent to said main antenna along a direction of a beam width of said main antenna to be compressed and which is arranged in such a way that its beam axis is arranged to be parallel with a beam axis of said main antenna;

scanning an antenna beam of said antenna system along the direction of said beam width to be compressed and receiving, by said main antenna and said sub-antenna, a radio wave emitted from said main antenna and reflected from a scattering object; and setting received signals of said main antenna and said sub-antenna in phase and subjecting them to a multiplication process to obtain a plurality of synthetic reception signals, said beam compression method further comprising an output signal processing step, wherein, when a ratio of a value of the synthetic reception signal to a maximum set value of a radar display device is not less than a preset value, a received signal of said main antenna is output as a final antenna pattern output, and wherein, when the ratio of the value of the synthetic reception to said maximum set value is less than said preset value, there is no antenna pattern output.

2. A beam compression method for radar antenna patterns according to claim 1, wherein the preset value is 0.1.

3. A beam compression method for radar antenna patterns according to claim 1, wherein said step of providing said antenna system includes a step of providing a plurality of said sub-antennas, and wherein said multiplication process includes a step of obtaining a sum of the received signals of said sub-antennas, and a step of multiplying the sum of the received signals of said sub-antennas by the received signal of said main antenna.

4. A beam compression method for radar antenna patterns according to claim 2, wherein said step of providing said antenna system includes a step of providing a plurality of said sub-antennas, and wherein the multiplication process includes a step of obtaining a sum of the received signals of said sub-antennas, and a step of multiplying the sum of the received signals of said sub-antennas by the received signal of said main antenna.

5. A beam compression method for radar antenna patterns according to claim 1, wherein said step of providing said antenna system includes a step of providing a plurality of said sub-antennas, and wherein said multiplication process includes a step of successively multiplying the received signals of said sub-antennas by the received signal of main antenna.

6. A beam compression method for radar antenna patterns according to claim 2, wherein said step of providing said antenna system includes a step of providing a plurality of said sub-antennas, and wherein said multiplication process includes step of successively multiplying the received signals of said sub-antennas by the received signal of main antenna.

* * * * *